(12) United States Patent
Consoli et al.

(10) Patent No.: US 7,922,798 B2
(45) Date of Patent: Apr. 12, 2011

(54) GRANULATOR DEVICE

(75) Inventors: Salvatore Fabrizio Consoli, Bologna (IT); Andrea Nora, Castelnuovo Rangone (IT); Roberto Trebbi, Castenaso (IT)

(73) Assignee: I.M.A. Industria Macchine Automatiche S.p.A., Ozzano Emilia (IT)

( * ) Notice: Subject to any disclaimer, the term of this patent is extended or adjusted under 35 U.S.C. 154(b) by 512 days.

(21) Appl. No.: 11/910,398

(22) PCT Filed: Apr. 7, 2006

(86) PCT No.: PCT/IB2006/000986
§ 371 (c)(1),
(2), (4) Date: Oct. 1, 2007

(87) PCT Pub. No.: WO2006/109172
PCT Pub. Date: Oct. 19, 2006

(65) Prior Publication Data
US 2009/0291157 A1    Nov. 26, 2009

(30) Foreign Application Priority Data
Apr. 13, 2005 (EP) .................................. 05425212

(51) Int. Cl.
*B01D 46/04* (2006.01)
(52) U.S. Cl. ................ 96/229; 96/233; 95/281
(58) Field of Classification Search ............ 96/243, 96/275, 276, 228, 229, 233; 95/280
See application file for complete search history.

(56) References Cited

U.S. PATENT DOCUMENTS

| | | | | | |
|---|---|---|---|---|---|
| 905,999 | A | * | 12/1908 | Emerson | 96/233 |
| 1,691,514 | A | * | 11/1928 | Dollinger | 55/294 |
| 3,443,696 | A | * | 5/1969 | Schutte | 210/297 |
| 3,511,374 | A | | 5/1970 | Beal | |
| 4,084,947 | A | * | 4/1978 | Ear | 96/233 |
| 4,154,194 | A | * | 5/1979 | Geiger et al. | 118/401 |
| 4,155,726 | A | * | 5/1979 | Steinmeyer | 96/233 |
| 4,953,308 | A | * | 9/1990 | Basten et al. | 34/82 |
| 5,114,444 | A | * | 5/1992 | Stuble | 55/294 |

(Continued)

FOREIGN PATENT DOCUMENTS

DE          3920097          2/1990

(Continued)

*Primary Examiner* — Duane Smith
*Assistant Examiner* — Tiffany N Palmer
(74) *Attorney, Agent, or Firm* — Pearne & Gordon LLP

(57) ABSTRACT

A granulator device (1) for the treatment of powdered material, in particular pharmaceutical powdered material, comprises a substantially cylindrical container (2), in which there is a chamber (4) for treatment of the powdered material using a fluid flow fed into the chamber (4); filtering means (5) for filtering the inside of the chamber (4), the filtering means (5) being located in the chamber (4) and comprising at least one filter (5) with a cylindrical metal mesh filtering wall (6); and means (P) for cleaning the filtering means (5) which can be activated during maintenance operations, the cleaning means comprising at least one element (7) rotating about each filter (5) and supporting diffuser means (8) designed to diffuse a service fluid on the cylindrical wall (6) in order to eliminate any impurities trapped in the filter (5) wall (6); the cleaning means (P) also comprise means (9) for temporarily opening at least one portion (10) of the filter (5) to allow the service fluid to flow out of the filter (5) together with the impurities.

8 Claims, 2 Drawing Sheets

U.S. PATENT DOCUMENTS

| | | |
|---|---|---|
| 5,444,892 A | 8/1995 | Ris et al. |
| 5,868,807 A | 2/1999 | Luy et al. |
| 7,534,278 B2 * | 5/2009 | Consoli et al. .................. 55/302 |
| 2006/0150820 A1 | 7/2006 | Consoli et al. |

FOREIGN PATENT DOCUMENTS

| | | |
|---|---|---|
| EP | 1230973 | 8/2002 |
| JP | 05-49902 | 3/1993 |
| WO | WO 2005014157 | 2/2005 |

* cited by examiner

GRANULATOR DEVICE

TECHNICAL FIELD

The present invention relates to a granulator device.

In particular, the present invention is advantageously applied in the sector for the treatment of particulate or powdered material, in particular pharmaceutical powdered material, to which specific reference is made in the following description, without thereby limiting the scope of the invention, using a flow of operating fluid, that is to say, gaseous fluids or nebulised liquids, which are used to disagglomerate, support, transport and coat the powdered material.

BACKGROUND ART

At present fluid bed type granulator devices are known, which are generally used for the treatment of powdered materials and which basically comprise cylindrical containers with sealed walls, delimiting a chamber for treatment of the materials, a plurality of filtering means with solid walls, projecting into the treatment chamber, means for conveying an operating fluid flow, through the chamber, and cleaning means designed to remove dust from and wash the permanent filters.

The methods for removing dust from and washing the filtering means, designed to restore filtering means which have become clogged or less efficient to their former operating state, or to prepare the device for treating a material different to that treated in a previous processing cycle, have a critical role in many technologies for powders used, for example, in some chemical or pharmaceutical products.

Said dust removal methods must be carried out suitably in order to prevent the operating fluids entering the device from contaminating the powdered material and/or the operating fluids exiting the device from contaminating the environment, and/or to prevent the maintenance operations for the filters and the other operating parts of the device from being hazardous to the health of the personnel who perform them and the surrounding environment.

A granulator device of the type described above is known for example from U.S. Pat. No. 5,868,807, in which the filtering means consist of substantially tubular elements with rigid, filtering cylindrical outer walls, formed by a number of layers of metal mesh placed on top of one another and made into a single body by means of a sintering process.

According to the method described in said United States patent, the removal of dust from and washing of the filtering means are therefore achieved respectively by blowing compressed air, against the flow, through the wall of each filter, said air blown in by stationary nozzles covering the entire filtering surface of each of the filters, and by washing the outer surface of the filters by supplying a flow of water which is diffused by special nozzles, also stably supported by the outer walls of the container which circumscribes the product treatment chamber.

The device structured in this way allows the achievement of a degree of cleaning of the filtering means which is satisfactory for most applications in particular during the treatment of powdered materials for pharmaceutical use, but is very complex from the construction viewpoint, is very expensive and it is particularly difficult to check its operation.

One solution to such disadvantages is known from International Patent application PCT WO2005/014157 filed by the Applicant. It is a method for cleaning filters located in a granulator device, using an arm which rotates about each sintered metal mesh filter and supports diffuser nozzles designed to diffuse a service fluid (air and/or washing liquid) on the outer walls of the filters, internally and/or externally, so as to progressively cover the length of the walls and remove any impurities from them.

Said cleaning method proved effective, but only where the quantities of impurities were not significant. If large quantities of impurities build up at predetermined points of the filters, the service fluid cannot always perfectly dissolve and disperse said build ups.

DISCLOSURE OF THE INVENTION

The aim of the present invention is to provide a granulator device which is free of the disadvantages in the prior art devices described above.

Accordingly, the present invention provides a granulator device for the treatment of powdered material, in particular pharmaceutical powdered material, comprising a substantially cylindrical container, in which there is a chamber for treatment of the powdered material using a fluid flow fed into the chamber; filtering means for filtering the inside of the chamber, the filtering means being located in the chamber and comprising at least one filter with a cylindrical metal mesh filtering wall; and means for cleaning the filtering means which can be activated during maintenance operations, the cleaning means comprising at least one element rotating about each filter and supporting diffuser means designed to diffuse a service fluid on the cylindrical wall in order to eliminate any impurities trapped in the filter wall; the device being characterised in that the cleaning means also comprise means for temporarily opening at least one portion of the filter to allow the service fluid to flow out of the filter together with the impurities.

BRIEF DESCRIPTION OF THE DRAWINGS

The technical characteristics of the invention are described in the claims below and its advantages are more apparent from the detailed description which follows, with reference to the accompanying drawings which illustrate a preferred embodiment of the invention provided merely by way of example without restricting the scope of the inventive concept, and in which:

FIG. 1 is a schematic front view, partly in cross-section and with some parts cut away for clarity, of a preferred embodiment of a granulator device in accordance with the present invention;

FIG. 2 is a front view in cross-section of an element of the device illustrated in FIG. 1 in a first operating position; and FIG. 3 is a front view in cross-section of the element illustrated in FIG. 2 in a second operating position.

DESCRIPTION OF THE PREFERRED EMBODIMENTS OF THE INVENTION

With reference to FIG. 1, the numeral 1 denotes as a whole a granulator device designed for treating a powdered pharmaceutical material.

The device 1 is of the known type comprising a substantially cylindrical container 2 with sealed walls 3 which are designed to delimit a powdered material treatment chamber 4, and generator means (known and not illustrated) designed to generate and diffuse an operating fluid flow (gaseous fluids or nebulised liquids) in the chamber 4 for a granulation treatment (disagglomeration, support, transport, coating, etc.) for the powdered material.

Inside the chamber 4 there is a plurality of filters 5, projecting into the treatment chamber 4 from an upper area of the chamber 4, for filtering the air in the chamber 4 in such a way that they retain any impurities generated during the granulation treatment.

Figure 1:
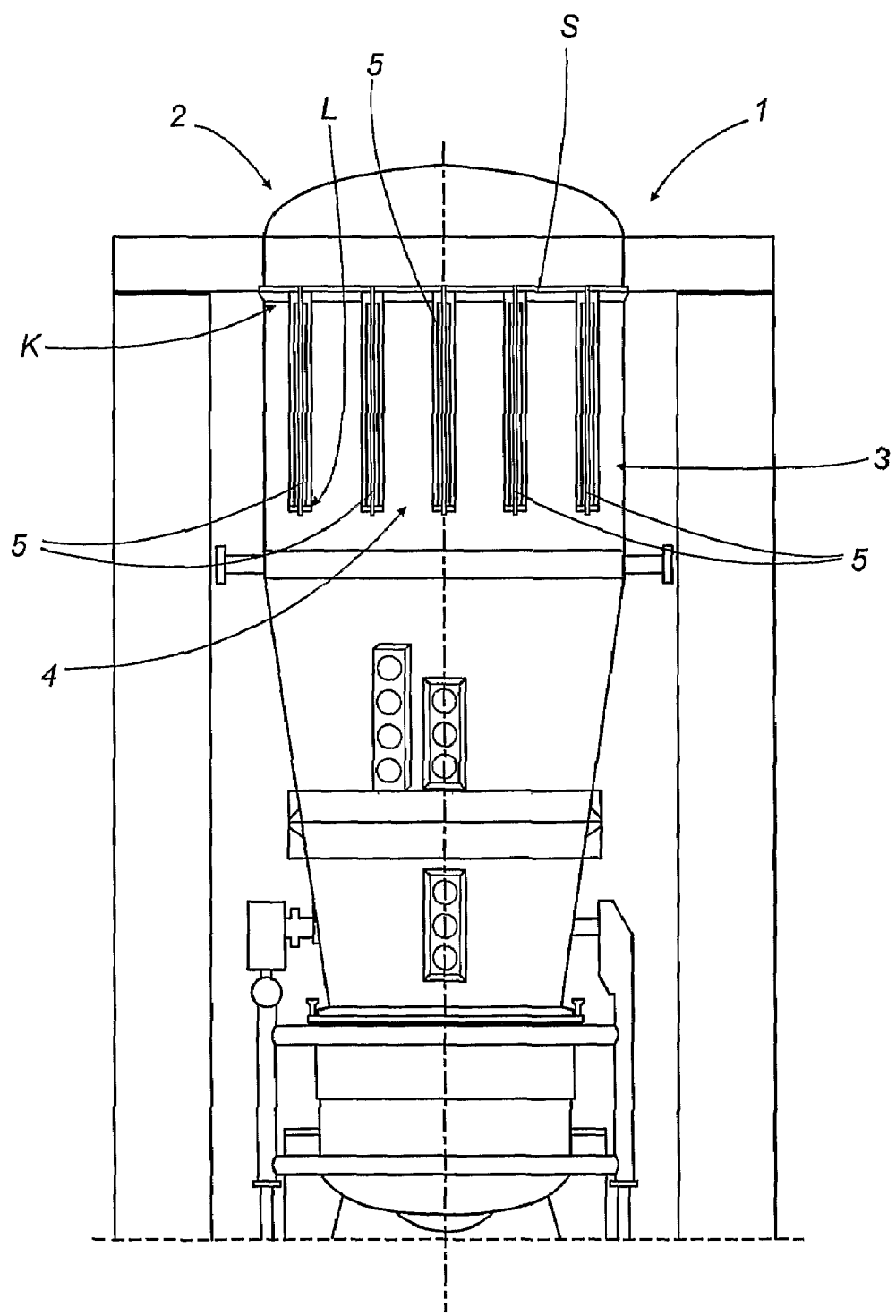
Figure 2:
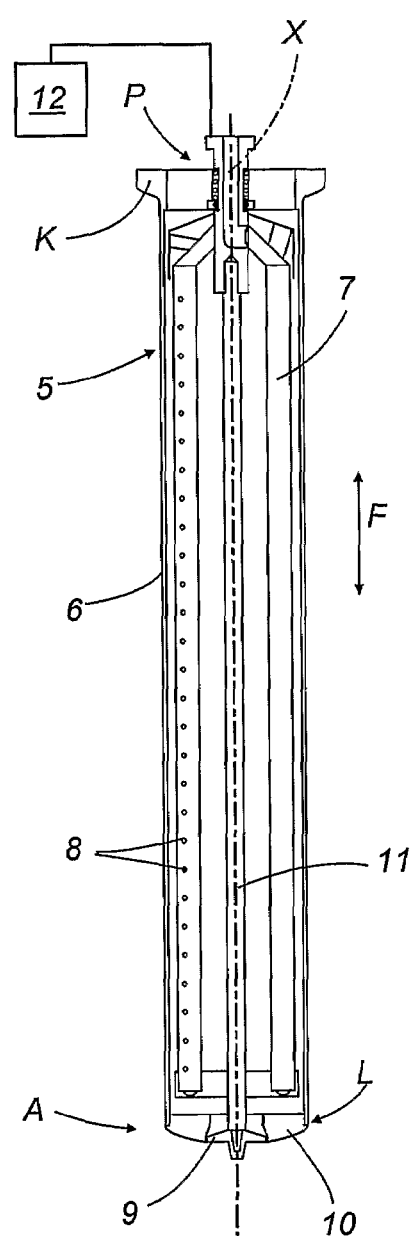
Figure 3:
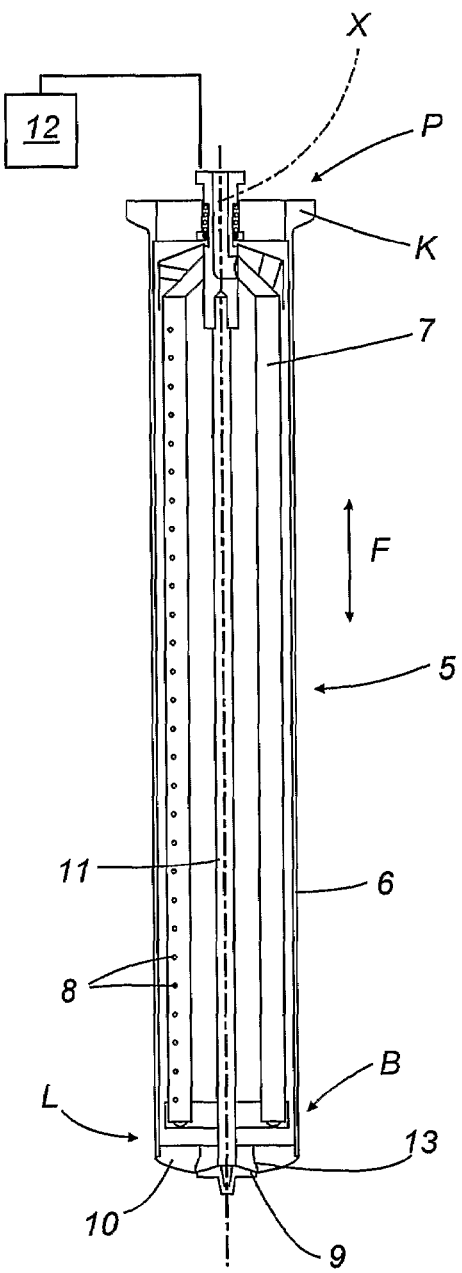

As illustrated in FIGS. 2 and 3, each filter 5 comprises a hollow cylindrical filtering wall 6, preferably made of a rigid material consisting of a number of layers of metal mesh placed one on top of another and made into a single body by a known sintering process, an open top end of which K is supported by a support block S fixed inside the device 1 chamber 4, whilst the opposite, lower end of the filter 5 is sealed by a base wall L.

Also attached to the device 1 are means P for cleaning the filters 5 which, for each filter 5, comprise an element 7 located inside the cylindrical surface 6, being of the type described and illustrated in International patent application PCT WO2005/014157, and therefore rotatably mounted about a vertical axis X so that it rotates about the axis X when driven by actuator means (known and not illustrated) whose activation is controlled during filter 5 cleaning operations (therefore after completion of the granulation treatment) to promote elimination from the filter 5 of any impurities or clumps of powdered material which have built up on the surface 6, using nozzles or holes 8 designed to gradually diffuse on the surface 6 a flow of water or another washing fluid from a special tank (known and not illustrated).

The cleaning means P also comprise means 9 for temporarily opening a central portion 10 of the base wall L: said means comprise a plug element 9 fixed to one end of a central rod 11 coaxial with the axis of rotation X of the rotating element 7.

The rod 11 is attached to actuator means, schematically illustrated in FIGS. 2 and 3 with a block 12, designed to move the rod 11 vertically and axially (arrow F) so that the plug element 9 moves between a position A in which the filter 5 is sealed closed (FIG. 2) and a position B in which the central portion 10 of the filter 5 is open (FIG. 3).

Therefore, during device 1 maintenance operations and in particular filter 5 cleaning, thanks to the washing fluid which comes out of the holes 8 in the rotating element 7 and is diffused over the entire surface 6 of each filter 5 in position A (that is to say, with the plug element 9 closed) general filter 5 cleaning is carried out, whilst in the open position B (that is to say, with the plug element 9 open), the washing fluid and any impurities or even significant quantities of clumps of excess powdered material which built up on the surface 6 can rapidly and effectively flow out of the filter 5 through the air spaces 13 created on the base wall L between the portion 10 and the plug element 9.

In this way the filter 5 is perfectly clean and ready to operate with maximum filtering efficiency.

The invention described can be modified and adapted without thereby departing from the scope of the inventive concept. Moreover, all technical details of the invention may be substituted by technically equivalent elements.

The invention claimed is:

1. A granulator device for the treatment of powdered material comprising a container, in which there is a chamber for treatment of the powdered material using a fluid flow fed into the chamber; filtering means for filtering the inside of the chamber, the filtering means being located in the chamber and comprising at least one filter fixed inside the chamber and having a cylindrical metal mesh filtering wall having an inner surface; and means for cleaning the filtering means which can be activated during maintenance operations, the cleaning means comprising at least one element located inside the filter, the element being rotatably mounted about a vertical axis X so that it can rotate inside the filter about the axis X when driven by actuator means, the element supporting diffuser means designed to diffuse a service fluid onto the inner surface of the cylindrical filtering wall in order to eliminate impurities trapped in the filter wall; the diffuser means comprising a plurality of nozzles arranged one above the other, the cleaning means also comprising opening means for temporarily opening at least one portion of the filter to allow the service fluid to flow out of the filter together with the impurities.

2. The device according to claim 1, wherein the cylindrical filtering wall of the filter has one end closed by a base wall; the portion consisting of a central section of the base wall.

3. The device according to claim 2, wherein the opening means comprise plug means, the plug means being fixed to one end of a rod which moves coaxially relative to the filter.

4. The device according to claim 3, wherein the rod is attached to actuator means designed to move the rod between a first position in which the portion is closed by the plug means, and a second position in which the portion is open; in said second position in which there is an opening between the plug means and the central section there being at least one air space through which the service fluid flows out.

5. The device according to claim 1, wherein the service fluid is a washing liquid.

6. The device according to claim 2, wherein the service fluid is a washing liquid.

7. The device according to claim 3, wherein the service fluid is a washing liquid.

8. The device according to claim 4, wherein the service fluid is a washing liquid.

\* \* \* \* \*